United States Patent
Senoue

(10) Patent No.: US 11,190,046 B2
(45) Date of Patent: Nov. 30, 2021

(54) BATTERY MODULE

(71) Applicants: KABUSHIKI KAISHA TOSHIBA, Minato-ku (JP); Toshiba Infrastructure Systems & Solutions Corporation, Kawasaki (JP)

(72) Inventor: Kiyoshi Senoue, Kashiwazaki (JP)

(73) Assignees: KABUSHIKI KAISHA TOSHIBA, Minato-ku (JP); Toshiba Infrastructure Systems & Solutions Corporation, Kawasaki (JP)

( * ) Notice: Subject to any disclaimer, the term of this patent is extended or adjusted under 35 U.S.C. 154(b) by 113 days.

(21) Appl. No.: 16/157,259

(22) Filed: Oct. 11, 2018

(65) Prior Publication Data
US 2019/0044376 A1 Feb. 7, 2019

Related U.S. Application Data

(63) Continuation of application No. PCT/JP2016/061933, filed on Apr. 13, 2016.

(51) Int. Cl.
*H02J 9/06* (2006.01)
*B60L 53/00* (2019.01)
(Continued)

(52) U.S. Cl.
CPC ............ *H02J 9/061* (2013.01); *B60L 3/0092* (2013.01); *B60L 3/04* (2013.01); *B60L 53/00* (2019.02);
(Continued)

(58) Field of Classification Search
CPC ..... H02J 9/061; H02J 1/10; H02J 7/00; B60L 53/00; B60L 53/53; B60L 3/0092; B60L 3/04; H01M 10/4257; H01M 10/44
(Continued)

(56) References Cited

U.S. PATENT DOCUMENTS 5,170,151 A * 12/1992 Hochstein ............. H02J 7/0032
                                                                307/10.7
2011/0140669 A1 * 6/2011 Murakami ............. B60L 58/18
                                                                320/134
(Continued)

FOREIGN PATENT DOCUMENTS

EP      2 587 618 A2    5/2013
JP      2008-109517     5/2008
(Continued)

OTHER PUBLICATIONS

Extended European Search Report dated Aug. 5, 2019 in Patent Application No. 16898618.0, 7 pages.
(Continued)

*Primary Examiner* — Hal Kaplan
*Assistant Examiner* — Swarna N Chowdhuri
(74) *Attorney, Agent, or Firm* — Oblon, McClelland, Maier & Neustadt, L.L.P.

(57) ABSTRACT

A battery module according to an embodiment includes a battery; a breaker that switches electrical connection of an output line from the battery to outside; a power source switch circuit that receives an internal source voltage supplied from the battery, an external source voltage supplied from an external power source, and an boot signal from outside, and switches a source of power that supplies source voltage from the external power source to the battery when at least one of the external source voltage and the boot signal is at a second level; and a control circuit that uses, as power supply, the source voltage that is output from the power source switch circuit, and controls operation of the breaker and of the power source switch circuit.

5 Claims, 3 Drawing Sheets

(51) Int. Cl.
*H01M 10/44* (2006.01)
*B60L 53/53* (2019.01)
*B60L 3/00* (2019.01)
*H02J 7/00* (2006.01)
*H02J 1/10* (2006.01)
*B60L 3/04* (2006.01)
*H01M 10/42* (2006.01)
*H02J 1/08* (2006.01)

(52) U.S. Cl.
CPC ......... *B60L 53/53* (2019.02); *H01M 10/4257* (2013.01); *H01M 10/44* (2013.01); *H02J 1/10* (2013.01); *H02J 7/00* (2013.01); *H02J 7/0031* (2013.01); *H02J 7/0063* (2013.01); *H02J 9/06* (2013.01); *B60L 2240/547* (2013.01); *B60L 2240/549* (2013.01); *H01M 2010/4271* (2013.01); *H01M 2220/20* (2013.01); *H02J 1/082* (2020.01); *H02J 9/068* (2020.01); *H02J 2207/10* (2020.01)

(58) Field of Classification Search
USPC .............................................. 307/9.1, 80, 10
See application file for complete search history.

(56) References Cited

U.S. PATENT DOCUMENTS

| | | | | |
|---|---|---|---|---|
| 2012/0074900 | A1* | 3/2012 | Takikita | H02J 7/02 320/109 |
| 2013/0106320 | A1* | 5/2013 | Yugo | H02J 1/08 318/139 |
| 2014/0001844 | A1* | 1/2014 | Krieg | H02J 7/14 307/10.7 |

FOREIGN PATENT DOCUMENTS

| | | |
|---|---|---|
| JP | 2011-127969 | 6/2011 |
| JP | 2012-70539 A | 4/2012 |
| JP | 2012-070593 | 4/2012 |
| WO | WO 2012/127659 A1 | 9/2012 |

OTHER PUBLICATIONS

International search Report dated Jul. 19, 2016 in PCT/JP2016/061933 filed Apr. 13, 2016 (with English Translation).
Written Opinion dated Jul. 19, 2016 in PCT/JP2016/061933 filed Apr. 13, 2016.

* cited by examiner

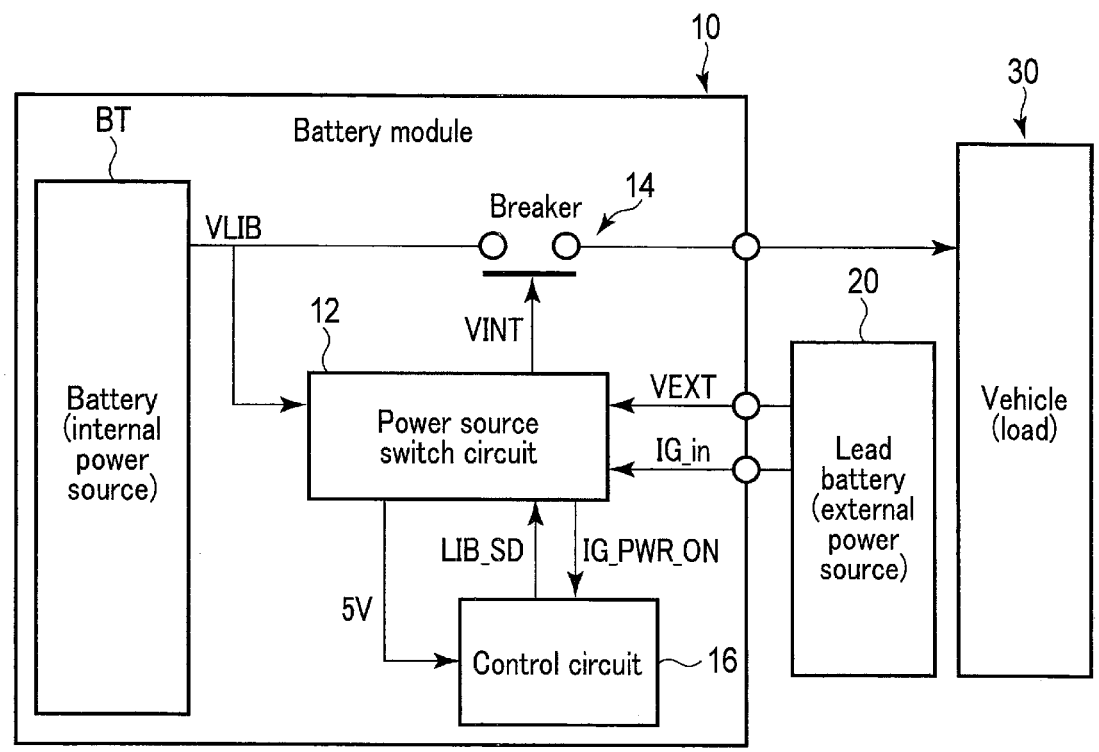
F I G. 1

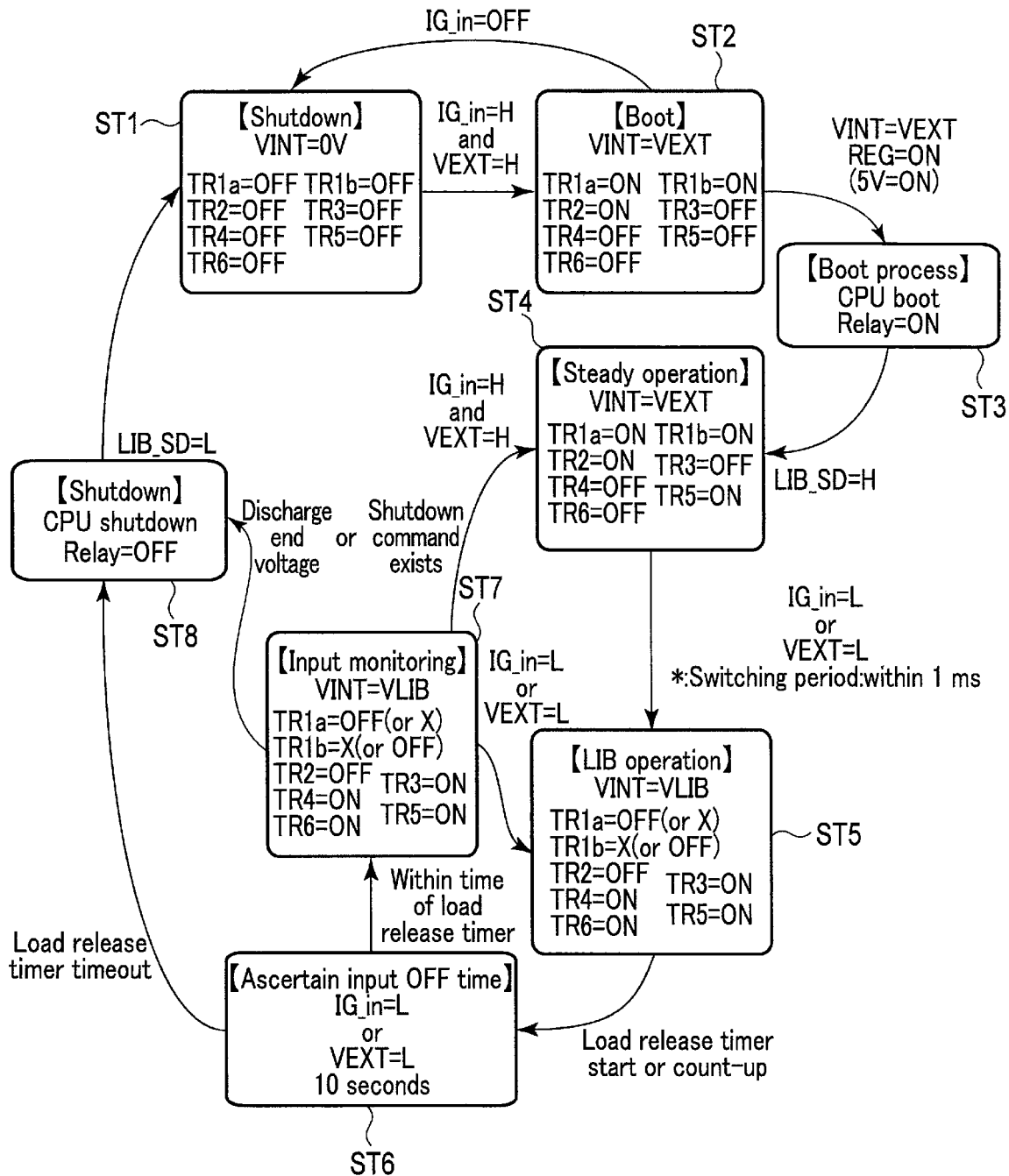
F I G. 3

BATTERY MODULE

CROSS REFERENCE TO RELATED APPLICATIONS

This application is a Continuation Application of PCT Application No. PCT/JP2016/061933, filed Apr. 13, 2016, the entire contents of which are incorporated herein by reference.

FIELD

Embodiments described herein relate generally to a battery module.

BACKGROUND

A battery module comprises, for example, a storage cell, a control circuit controlling the operation of the battery module, and a breaker that is provided at the output line from the storage cell and that switches between conducting and cutting off the output line. The control circuit operates on power from a power source (external power source) which is, for example, mounted on a device to which the battery module is mounted, and controls the operation of the storage cell or the breaker.

When such battery module is installed in a vehicle such as an electric vehicle or a hybrid vehicle, it sometimes occurred that the source power supplied from the vehicle became unstable due to the operation of the vehicle. When, for example, the power supply line or communication line from the vehicle is disconnected, power from the power source is no longer supplied to the control circuit of the battery module. It also sometimes occurred that the source power supplied to the battery module's control circuit momentarily stopped, for example, when the vehicle suddenly started moving.

Where the breaker is a relay or a contactor being conductive (ON) by passing an electric current, the conductive (ON) state of the breaker cannot be secured unless the relay or contactor conducts constantly. As a consequence, more power is consumed. Also, where the breaker is a relay or a contactor being conductive (ON) by passing a current, the breaker goes into open (insulated) state since the power supply from the external power source stops instantaneously. For this reason, a battery module is being suggested having a capacitor for retaining the potential of the control signal to be transmitted to the breaker of the battery module.

There is, however, a limit to the magnitude of capacity to be added. When increasing the capacity to be added for retaining the potential, the external shape of the module grew in size and keeping the manufacturing cost low became a challenge.

Where the breaker is a latching relay or the like in which conduction and insulation are controlled by one-shot pulses, and when the supply of source power from the external power source to the control circuit of the battery module is stopped, the control circuit is assumed as being unable to open the breaker, and, in the worst cases, has been prone to accidents such as short circuits.

BRIEF DESCRIPTION OF THE DRAWINGS

FIG. 1 is a block diagram illustrating an example configuration of the battery module according to an embodiment.

FIG. 3 is a state transition diagram illustrating an example operation of a control circuit and a power source switch circuit in the battery module according to the embodiment.

DETAILED DESCRIPTION

Figure 2:
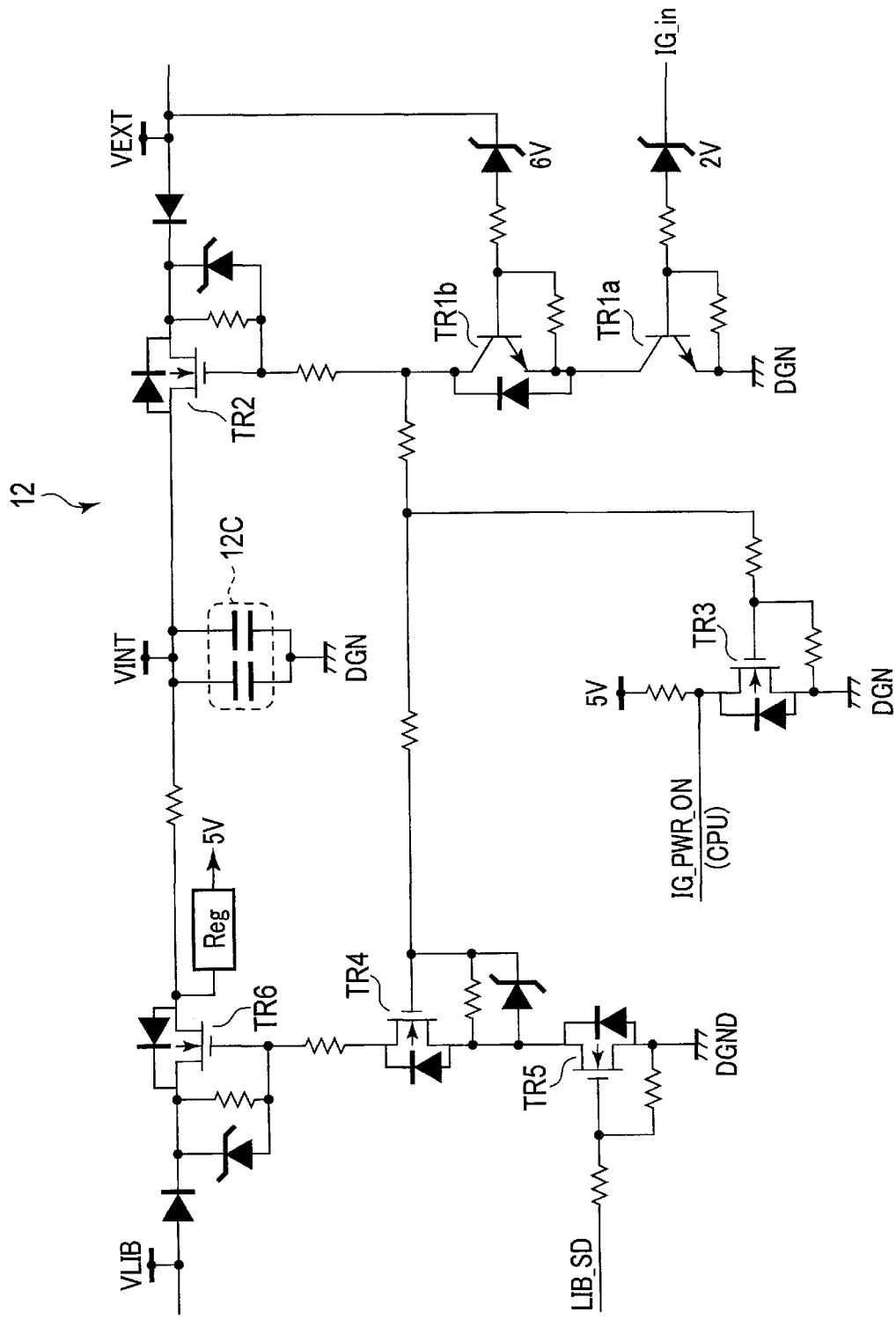
FIG. 2 is a diagram illustrating an example configuration of a power source switch circuit in the battery module according to the embodiment.

A battery module according to an embodiment, comprising: a battery; a breaker that switches electrical connection of an output line from the battery to outside; a power source switch circuit that receives an internal source voltage supplied from the battery, an external source voltage supplied from an external power source, and an boot signal from outside, and switches a source of power that supplies source voltage from the external power source to the battery when at least one of the external source voltage and the boot signal is at a second level; and a control circuit that uses, as power supply, the source voltage that is output from the power source switch circuit, and controls operation of the breaker and of the power source switch circuit.

The battery module of the embodiment will be described herein with reference to the drawings.

FIG. 1 is a block diagram illustrating an example configuration of the battery module according to the embodiment.

The battery module 10 in this embodiment is a direct current load that is electrically connected to a vehicle load 30 and to a lead battery 20 being an external power source. In the embodiment, the battery module 10 is mounted in, for example, an electric vehicle. The vehicle load 30 comprises a motor (AC load) and an inverter not shown in the drawings. The inverter is, for example, a bi-directional 3-phase AC inverter converting, on the one side, a direct current supplied from the battery module 10 into an alternating current and then supplying the alternating current to the motor, and, on the other side, a regenerative current from the motor into a direct current and then supplying the direct current to the battery module 10. The motor is driven by alternating current supplied from the inverter. The power from the motor rotation is transmitted via an axle that is not shown in the drawings to the wheels.

The lead battery 20 supplies a source voltage VEXT and a boot signal IG_in to the battery module 10. The source voltage VEXT is a signal from the lead battery 20 that is constantly connected to the battery module 10. The boot signal IG_in is a signal supplied by a host control device (not shown) that executes a control by which the devices mounted to the electric vehicle are synchronized. Note that the boot signal IG_in and the source voltage VEXT may be the same power source (signal).

The battery module 10 in this embodiment comprises a battery BT, a power source switch circuit 12, a control circuit (CPU) 16, and a breaker 14.

The battery BT includes a plurality of secondary battery cells not shown in the drawings. The battery BT outputs a voltage VLIB to the exterior via the breaker 14 switching the electrical connection in the main circuit being the output line from the battery BT to the exterior. The output voltage (internal source voltage) VLIB of the battery BT is constituted such that it can be supplied to the power source switch circuit 12.

The breaker 14 is a switching means for electrically switching the connection in the main circuit. The breaker 14 may be, for example, a relay or contactor that is conductive when a current flows, or a latching relay controlling conduction and insulation operations by one-shot pulses. In this embodiment, the operation of the breaker 14 is controlled by a voltage VINT supplied from the power source switch circuit 12.

The control circuit 16 is a computing means that comprises a processor such as a central processing unit (CPU) or a micro processing unit (MPU), and a memory. The control circuit 16, is being supplied with a voltage of 5 V as source voltage from the power source switch circuit 12. The control circuit 16 determines, based on a signal IG_PWR_ON supplied from the power source switch circuit 12, whether or not there is a source of power (voltage VEXT) to be supplied from the exterior, and switches a control signal LIB_SD to be transmitted to the power source switch circuit 12. The control circuit 16 comprises a counting means for counting the time during which the signal IG_PWR_ON is at a low level (L-level).

The power source switch circuit 12 supplies the source voltage (5 V) to the control circuit 16 and the voltage VINT to the breaker 14, and switches, based on the start-up signal IG_in from the exterior, between supplying and stopping the supply of power to be supplied from the battery module 10 to the vehicle load 30. The power source switch circuit 12 is supplied with the output voltage VLIB from the battery BT and the voltage VEXT supplied from the exterior (lead battery 20) of the battery module 10.

When, in this embodiment, the supply of source power from the exterior is stopped, the power source switch circuit 12 can autonomously switch the origin of the supply of source power to the control circuit 16 from the external power source to the internal power source without depending on the control of the control circuit 16. In this manner, it is possible to continue the operation of the control circuit 16 even when the supply of power from the external power source is stopped, and safely shutdown the battery module 10.

FIG. 2 is a diagram illustrating an example configuration of the power source switch circuit in the battery module according to the embodiment.

The power source switch circuit 12 comprises a plurality of switching elements TR1a to TR6, a rectifying element, a resistor, a regulator Reg, and a capacitor 12C.

It is possible to use transistors such as Insulated Gate Bipolar Transistors (IGBTs) or Metal Oxide Semiconductor FETs (MOSFETs) for the plurality of switching elements TR1a to TR6. The switching elements TR1a and TR1b are, for example, IGBTs and the switching elements TR2 to TR6 are, for example, MOSFETs.

The emitter of the switching element TR1a is grounded. The collector of the switching element TR1a is electrically connected to the emitter of the switching element TR1b. The boot signal IG_in is applied to the base of the switching element TR1a via a constant voltage diode having a threshold of 2 V. The emitter and the base of the switching element TR1a are electrically connected via a resistor. The threshold of the diode connected to the base of the switching element TR1a is not limited to 2 V, and may be variable. The diode may be omitted.

The switching element TR1b is connected in series with the switching element TR1a. The emitter of the switching element TR1b is electrically connected to the collector of the switching element TR1a. The collector of the switching element TR1b is electrically connected to the bases of the switching elements TR2 to TR4 via resistors. The switching element TR1b is connected in parallel to a diode whose forward direction is the direction from the emitter to the collector. The voltage VEXT is applied to the base of the switching element TR1b via a constant voltage diode having a threshold of 6 V. The emitter and the base of the switching element TR1b are electrically connected via a resistor. The threshold of the diode connected to the base of the switching element TR1b is not limited to 6 V, and may be variable. The diode may be omitted.

The emitter of the switching element TR2 is electrically connected to the output terminal of the voltage VINT, and the collector of the switching element TR2 is electrically connected to the input terminal of the voltage VEXT via a diode whose forward direction is the direction of input to the collector. The base of the switching element TR2 is electrically connected via a resistor to the collector of the switching element TR1b. Between the collector and the base of the switching element TR2, a resistor and a constant voltage diode whose forward direction is the direction from the base to the collector are connected in parallel. The switching element TR2 is connected in parallel to a diode whose forward direction is the direction from the emitter to the collector of the switching element TR2.

The emitter of the switching element TR3 is grounded. The collector of the switching element TR3 is electrically connected via a resistor to the output terminal of the 5 V-source voltage. The source voltage of 5 V is supplied from the regulator Reg described further below. The base of the switching element TR3 is electrically connected via a resistor to the collector of the switching element TR1b. The base and the emitter of the switching element TR3 are electrically connected via a resistor.

The signal IG_PWR_ON input terminal of the control circuit 16 is electrically connected between the collector of the switching element TR3 and the input terminal of the source voltage of 5 V. In other words, the signal IG_PWR_ON goes to a high level (H-level) when both the boot signal IG_in and the external source voltage VEXT are supplied (when at the H-level), and goes to a low level (L-level) when the supply of at least one of the boot signal IG_in and the external source voltage VEXT is stopped (when at the L-level).

The emitter of the switching element TR4 is electrically connected to the collector of the switching element TR5. The collector of the switching element TR4 is electrically connected via a resistor to the base of the switching element TR6. The base of the switching element TR4 is electrically connected via a resistor to the collector of the switching element TR1b. A resistor and a constant voltage diode whose forward direction is the direction from the emitter to the base are connected in parallel between the emitter and the base of the switching element TR4. The switching element TR4 is connected in parallel to a diode whose forward direction is the direction from the emitter to the collector of the switching element TR4.

The emitter of the switching element TR5 is grounded. The collector of the switching element TR5 is electrically connected to the emitter of the switching element TR4. The base of the switching element TR5 is electrically connected via a resistor to the output terminal of the control signal LIB_SD. The emitter and the base of the switching element TR5 are electrically connected via a resistor.

The emitter of the switching element TR6 is electrically connected to the output terminal of the voltage VINT, and the collector of the switching element TR6 is electrically connected to the input terminal of the voltage VLIB via a diode whose forward direction is the direction of input to the collector. The base of the switching element TR6 is electrically connected via a resistor to the collector of the switching element TR4. A resistor and a constant voltage diode whose forward direction is the direction from the base to the collector are connected in parallel between the collector and the base of the switching element TR6. The switching element TR6 is connected in parallel to a diode whose forward direction is the direction from the emitter to the collector of the switching element TR6.

The regulator Reg is connected between the collector (drain) of the switching element TR6 and the collector (drain) of the switching element TR2, and it converts into and outputs a source voltage of 5 V.

The capacitor 12C comprises a condenser that retains the potentials of both ends of the output terminal of the voltage VINT. When the supply of the source voltage VEXT from the exterior is stopped, the value of the output voltage VINT is retained by the capacitor 12C for a certain period of time. Since, when the source voltage VEXT from the external source voltage VEXT is stopped, the time required in the embodiment until the power is supplied by the voltage VLIB of the battery BT to the control circuit 16 lies within approx. 1 ms, the capacitor 12C only needs to retain the output voltage VINT for approx. 1 ms. Note that setting the capacitor 12C to a size appropriate to the value of the output voltage VINT, the period of retaining the output voltage VINT, and the configuration of the breaker 14 is desirable.

An example operation of the battery module according to the aforementioned embodiment will be described herein.

FIG. 3 is a state transition diagram illustrating an example operation of the control circuit and the power source switch circuit in the battery module of the embodiment. Note that in the following description, for example, the first level of the signal (or voltage) is set to the H-level and the second level is set to the L-level.

In the state (ST1) in which the battery module 10 is shutdown, the boot signal IG_in is OFF (reaches the L-level), and the output voltage VINT of the battery module 10 is 0 V. In this time, all the switching elements TR1a to TR6 are OFF.

When the boot signal IG_in goes ON (when it reaches the H-level), supply of the external source voltage VEXT is initialized, and VEXT goes ON (it reaches the H-level). As a result, the switching elements TR1a, TR1b, and TR2 enter a conductive state. Similar to the external source voltage VEXT, the output voltage VINT of the battery module 10 reaches the H-level and the voltage VEXT is supplied to the regulator Reg. (ST2)

When a voltage of the H-level is supplied, the regulator Reg is activated and outputs a source voltage of 5 V, which is then supplied as the power to the control circuit 16. The control circuit 16 is activated by a source voltage of 5 V. Similar to the external source voltage VEXT, the output voltage VINT reaches the H-level, and connects (ON) the breaker 14. The control circuit 16 sets the control signal LIB_SD to be transmitted to the power source switch circuit 12 to the H-level. Then, the boot process ends. (ST3)

As described above, the control signal LIB_SD is switched between the H-level and the L-level by the control circuit 16. Note that the control circuit 16 switches the control signal LIB_SD from the H-level to the L-level, and switches the power supply of the battery module 10 from ON to OFF. In other words, when the battery module 10 is activated and steady operation is executed, the control signal LIB_SD is set to the H-level by the control circuit 16. For the case in which the voltage VEXT (or the boot signal IG_in) reaches the low level, the control circuit 16 sets in advance the control signal LIB_SD to the H-level and prepares to supply the output voltage VLIB from the battery BT to the control circuit 16. When the battery module 10 shutdown (when the power supply within the battery module 10 is OFF), the control signal LIB_SD is set to the L-level by the control circuit 16.

When the power supply circuit 12 is shutdown (when the power is OFF), and when the voltage VEXT (or the boot signal IG_in) is at the low level and a shutdown command is received from the host control device based on a communication protocol such as CAN/LIN, the supply of the output voltage VLIB from the battery BT to the control circuit 16 is shutdown since the control signal LIB_SD reached the L-level.

When the control signal LIB_SD reaches the H-level, the switching element TR5 of the power source switch circuit 12 goes ON, and the battery module 10, while in a state of being supplied from the lead battery 20 being the external power source, goes into steady state in which the voltage VLIB from the battery BT is supplied to the battery load 30. (ST4)

In steady state, the control circuit 16 samples and monitors, at a predetermined timing, the signal IG_PWR_ON from the power source switch circuit 12, and monitors whether or not there is a supply of source power from the lead battery 20.

In ST4, steady operation is continued by the power source switch circuit 12 when the signal IG_PWR_ON in the power source switch circuit 12 is at the H-level (when both boot signal IG_in and external source voltage VEXT are at the H-level).

When at least one of the boot signal IG_in and the external source voltage VEXT is at the L-level (when signal IG_PWR_ON is at the L-level), the power supply from the lead battery 20 is stopped. When, in ST4, at least one of the boot signal IG_in and the external source voltage VEXT is at the L-level, the power source switch circuit 12 switches the supply of source power to the control circuit 16 from the lead battery 20 being the external power source to the battery BT being the internal power source.

As described above, the operation of the power source switch circuit 12 switching the source of power supply to be supplied from the voltage VEXT to the control circuit 16 from the lead battery 20 to the battery VLIB is done independently by the power source switch circuit 12 (without depending on the control of the control circuit 16) because of the circumstance that the control signal LIB_SD has already reached the H-level beforehand. In other words, since the origin of the supply of source power to the control circuit 16 in this embodiment is switched solely by the operation of the power source switch circuit 12, the time required for switching can be shortened so that the control circuit 16 remains unaffected (e.g., by power stoppages). In this manner, the control of the battery module 10 can be continued without shutdown the control circuit 16. Note that in this time, the control circuit 16 merely monitors whether or not there is a supply of source power from the lead battery 20. The control of the control circuit 16 is executed when the supply of source power to the control circuit 16 is switched from the battery BT to the lead battery 20.

In other words, when the boot signal IG_in is at the L-level, or when the external source voltage VEXT is at the L-level, the switching element TR2 goes OFF, and the switching elements TR3 and TR4 go ON. As a result, the switching element TR6 also goes ON. In this state, the voltage VINT becomes equal to the internal source voltage VLIB, and the regulator Reg is supplied with the voltage VLIB from the battery BT. Note that in this embodiment, as described above, the operation by the power source switch circuit 12 of switching the source of power supplying the source voltage to the control circuit 16 from the lead battery 20 being the external power source to the battery BT being the internal power source is executed within 1 ms. (ST5)

Note that when, in ST 5 to ST 7, the signal IG_PWR_ON is at the L-level (when the boot signal IG_in=L), and when the command to the control circuit 16 from the host control device not shown in the drawings to shutdown the battery module 10 is received based on a communication protocol such as CAN/LIN, the control circuit 16 initializes a process of shutdown of the battery module and turns OFF the breaker 14. After all shutdown processes are completed, the control circuit 16 sets the control signal LIB_SD to the L-level and turns OFF the switching element TR5 of the power source switch circuit 12, as well as switches OFF the switching elements TR4 and TR6 and stops the power supply (stops the regulator Reg). Subsequently, the switching element TR3 goes OFF. (ST1)

When the signal IG_PWR_ON reaches the L-level, the control circuit 16 starts counting up and determines whether or not the period in which the power supply from the lead battery 20 has been stopped is equal to or exceeds a predetermined threshold. In this embodiment, the control circuit 16 determines whether or not the period in which the signal IG_PWR_ON has been at the L-level, i.e., the period during which at least one of the boot signal IG_in and the external source voltage VEXT is at the L-level has been 10 sec or more. (ST6)

The control circuit 16 monitors the signal IG_PWR_ON, and, until the predetermined threshold has passed, continues to source power supply from the battery BT to the control circuit 16 for the time in which the signal IG_PWR_ON is at the L-level. (ST5)

When the signal IG_PWR_ON reaches the H-level within a predetermined threshold, both the boot signal IG_in and the external source voltage VEXT are at the H-level, and the control circuit 16 switches the control signal LIB_SD to the L-level. In this manner, in the power source switch circuit 12, the source of power supplying the source voltage to the control circuit 16 is switched from the battery BT to the lead battery 20. (ST 4) Since, at this point, the control signal LIB_SD reached the L-level, the supply of source power from the battery BT to the power source switch circuit 12 is stopped. However, since the voltage VEXT from the lead battery 20 is secured, the output voltage VINT is retained. Note that when the battery module 10 is booted, the control signal LIB_SD is at the L-level. Immediately after the control circuit 16 starts up, the I/O port of the control circuit 16 is at the L-level since it is H-Zi (no signal). When steady operation starts, the control circuit 16 sets the control signal LIB_SD to the H-level and maintains thereafter the H-level until completely stopped or until the VEXT (IG_in) is secured.

Note that during the time that the source voltage is being supplied from the battery BT, the control circuit 16 monitors the value of the source voltage (or the voltage of the battery BT) and determines whether or not the voltage of the battery BT is equal to or less than a discharge end voltage. (ST7)

In ST 6, the control circuit 16 monitors the signal IG_PWR_ON and executes the shutdown process when the period during which the signal IG_PWR_ON is at the L-level exceeds a predetermined threshold, and, in the case that the source voltage is supplied from the battery BT, when the voltage of the battery BT becomes equal to or less than the discharge stop voltage. (ST8) In the shutdown process, the control circuit 16 initializes the process of shutdown of the battery module 10 and turns off the breaker 14. In other words, the control circuit 16 sets the control signal LIB_SD to the L-level and turns OFF the switching element TR5, switches OFF the switching elements TR4 and TR6 and stops the regulator Reg, and switches OFF the switching element TR3 and stops the power supply to the control circuit 16.

As described above, in the battery module 10 of the embodiment, the supply of source voltage to the control circuit 16 is switched between the external power source and the internal power source solely by the operation of the power source switch circuit 12. In this manner, the operation of the control circuit 16 can be continued even when the supply of source power from the external power source is stopped.

Where the breaker 14 is, for example, a relay or a contactor being conductive (ON) by passing an electric current, the breaker 14 goes into open (insulated) state since the supply of power from the external power source stops instantaneously. Also, more power is consumed since the conductive (ON) state of the breaker 14 passing the current is unsecured unless the current is constantly supplied.

Where the breaker 14 is, for example, a latching relay or the like in which conduction and insulation are controlled by one-shot pulses, and when the power supply (external power source) on the host device side or the control line or communication line is disconnected, the breaker 14 goes into a state in which it is impossible to control while maintaining conduction (ON) or insulation (OFF). Where the breaker 14 is in conductive (ON) state, the output terminal of the battery module remains in live-wire state, which is dangerous.

Since, in the battery module 10 according to this embodiment, as described above, the power supply to the control circuit 16 is not shutdown even when the supply of source power from the external power source is stopped, the control circuit 16 is able to control the breaker 14, and the operation of the battery module 10 after turning off the breaker 14 can be safely shutdown.

When the power supply from the external power source in the battery module 10 of the embodiment is temporary, it is possible to switch back the source of power supplying the source voltage to the control circuit 16 from the internal power source to the external power source. In this manner, less power stored in the internal power source is consumed.

Moreover, when, the control circuit 16 in the battery module 10 of this embodiment is operated by the internal power source (VLIB), the voltage of the battery BT can be monitored, and, when the voltage of the battery BT becomes the discharge end voltage or less, the operation of the battery module 10 can be caused to stop by itself (ST8) to prevent the battery BT from over-discharging; also, the output voltage VINT can be stopped (can be set to zero).

As described above, it is possible according to the embodiment to provide a battery module ensuring safety when the external power source is stopped.

Embodiments described above are mere examples and are not aimed at limiting the scope of the invention. It is possible to implement novel embodiments in any way, or to omit, substitute, or change them in different ways, as long as they remain faithful to the spirit of the invention. Embodiments and their modifications fall within the gist and scope of the present invention, and the claims and its equivalents.

Note that, although it was described in the above embodiment that the first level of the signal is set to the H-level (high level) and that the second level is set to the L-level (low level), the present invention is not limited thereto. Depending on the configuration of the power source switch circuit, the first level may be the L-level and the second level may be the H-level.

The invention claimed is:

1. A battery module, comprising:
    a battery;
    a breaker that controls conduction and insulation operations by one-shot pulses and switches electrical connection of an output line from the battery to outside;
    a power source switch circuit that receives an internal source voltage supplied from the battery, an external source voltage supplied from an external power source, and a boot signal from outside, and switches a source of power that supplies source voltage from the external power source to the battery when at least one of the external source voltage and the boot signal is at a second level lower than a first level; and
    a control circuit that uses, as a power supply, the source voltage that is output from the power source switch circuit, and controls operation of the breaker and of the power source switch circuit,
    wherein the control circuit turns OFF the breaker and stops the supply of the source voltage when a period during which the external source voltage or the boot signal is at the second level exceeds a predetermined threshold.

2. The battery module according to claim 1, wherein the control circuit turns OFF the breaker and stops supplying the source voltage when the battery voltage becomes equal to or less than a discharge end voltage in a period in which the external source voltage or the boot signal is at the second level.

3. The battery module according to claim 1, wherein the control circuit turns OFF the breaker and stops supplying the source voltage when, after a boot, the boot signal reaches the second level and a shutdown command is received.

4. The battery module according to claim 1, wherein the power source switch circuit has a capacitor capable of holding, for a predetermined period of time, a voltage for switching the breaker.

5. The battery module according to claim 1, wherein the control circuit controls the power source switch circuit and switches the source of power that supplies the source voltage from the battery to the external power source, when at least one of the external source voltage and the boot signal has reached the first level from the second level so that both of the external source voltage and the boot signal are at the first level.

* * * * *